(12) United States Patent
Fisher et al.

(10) Patent No.: US 7,401,175 B2
(45) Date of Patent: Jul. 15, 2008

(54) METHOD FOR DISPLAYING CARTRIDGE LOCATION

(75) Inventors: James Arthur Fisher, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 11/165,967

(22) Filed: Jun. 24, 2005

(65) Prior Publication Data

US 2006/0294338 A1    Dec. 28, 2006

(51) Int. Cl.
   G06F 3/06    (2006.01)
   G06F 7/00    (2006.01)
   G06F 12/00   (2006.01)
   G06F 13/00   (2006.01)
   G06F 13/28   (2006.01)

(52) U.S. Cl. ................... 711/4; 711/111; 710/3

(58) Field of Classification Search ............ None
   See application file for complete search history.

(56) References Cited

U.S. PATENT DOCUMENTS

| 4,974,156 A | 11/1990 | Harding et al. |
| 4,987,533 A | 1/1991 | Clark et al. |
| 5,455,409 A | 10/1995 | Smith et al. |
| 5,664,146 A * | 9/1997 | Bolin et al. ............ 711/115 |
| 5,721,655 A * | 2/1998 | Thweatt ............... 360/137 |
| 6,023,643 A * | 2/2000 | Jesionowski ........... 700/214 |
| 6,539,459 B1 * | 3/2003 | Tadokoro et al. ........ 711/154 |
| 6,832,287 B2 | 12/2004 | Beeston et al. |

* cited by examiner

*Primary Examiner*—Donald Sparks
*Assistant Examiner*—Frederick W Detschel
(74) *Attorney, Agent, or Firm*—Quarles & Brady LLP

(57) ABSTRACT

A method for displaying physical address of data storage media residing within an automated data storage library. A drive, including a drive processor and a drive display, recognizes a load display request received from a host computer/application that includes an identification of a data storage medium. The drive generates a request for the physical address of the data storage medium corresponding to the identification and transmits the request to a library controller. The library controller looks up the corresponding physical address and transmits it back to the drive, where it is displayed on the drive display.

8 Claims, 9 Drawing Sheets

METHOD FOR DISPLAYING CARTRIDGE LOCATION

BACKGROUND OF THE INVENTION

1. Field of the Invention

This invention is related in general to the field of data management systems. In particular, the invention consists of a method for displaying a physical location of a data storage medium within an automated data storage library.

2. Description of the Prior Art

Automated data storage libraries are used for providing cost effective storage and retrieval of large quantities of data. In an automated data storage library, data is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tap or disks), electronic media (such as PROM, EEPROM, flash PROM, Compactflash TM, Smartmedia TM Memory Stick TM, etc.), or other suitable media.

Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transporting such media to the data storage drives by moving in the X and Y directions.

Libraries typically use internal addressing to identify cartridge slot locations within the library. The internal addressing of the library is referred to as a library address or a physical address. Libraries typically present cartridge slot locations to host applications by way of an address, commonly referred to as an element address. The hosts' view of library reported address is referred to as a host address or a logical address. In some designs, the library address and the host address for any particular cartridge location may be the same. For example, all physical storage shelves in the library may be assigned a physical address beginning with a starting address and incrementing by one for each sequential slot in the library. This address information is presented by the library to host applications that send commands to the library to move cartridges based on this physical address information.

However, in some designs, the library address and the host address for a particular cartridge location is different. For example, the library may be partitioned into several logical libraries. Each logical library may be assigned to different host computers such that the host associated with one logical library has no awareness of any other logical libraries and associated cartridges. In this example, cartridges associated with one logical library may have the same logical address as seen by its host application as cartridges associated with another logical library as seen by its host application even though the library maintains unique physical addresses for each cartridge.

Virtualization of the storage slots in a library is another example of why the library address and the host address may not be the same. The library maintains a map of host (logical) storage addresses to actual library (physical) addresses when performing move operations and when reporting cartridge locations to a host application. The mapping of the logical address to the actual physical address must be maintained in a consistent fashion by the library so as to ensure proper movement of the intended cartridge. Using virtualization, the library may arbitrarily choose any slot to store media, i.e., the storage slots associated with a range of addresses used by a particular host need to be proximate and/or sequential. Mapping of addresses includes mapping of storage slots with or without media.

A host application manages data in a library using "location-centric" commands, and may utilize a medium changer protocol, such as small-computer systems interface (SCSI). The host application manages cartridge movement by specifying source and destination locations in the system. These source and destination locations are the element addresses reported by the library as host element addresses.

A host element addresses includes a host import/export element address (IEEA) which appears to the host as the address of an input/output slot. Additionally, the host element address includes a host storage element address which appears to the host as a storage slot location. Location-centric commands issued by a host application which include these host element addresses are mapped by the library to physical element addresses of actual media storage slots.

Host computers maintain a host catalog of these host element addresses, cross-referencing host element addresses with library data storage media cartridges. Each data storage media cartridge may be identified by a volume and serial number (VOLSER). Mapping the host element addresses to physical element addresses is managed by the library.

In an exemplary automated data storage library, a data storage media cartridge placed into a library's input/output station by either an automated device or an operator is issued an element address based on the physical location of the input/output station or the storage slot into which the cartridge is subsequently placed. In a library wherein the input/output stations and/or storage cells are segregated into cells, a 5-slot cell station may include a first slot having an element address and each subsequent slot's address would be an incremental increase of the starting slot's address. In this manner, a cartridge placed in the second slot would be given a physical element address one greater than that of the starting element address.

However, the element addresses of import/export elements (IEEs) may be virtualized, resulting in the use of virtual import/export element addresses (VIEEAs). In this manner, multiple hosts may share a single physical library and may utilize differing ranges of VIEE addresses for cartridges within its logical library. For example, a first host may be configured to access 10 import/export element addresses (IEEAs) while a second host may be configured to access 20 IEEAs. However, the physical element address for each cartridge may be reported to each host as a different VIEEA. Utilizing virutalization of the IEEAs, the cartridge placed in the second slot of the 5-cell station may posses a physical element address of 101 but be reported to the first host as VIEEA 106. By mapping the physical element address of each cartridge to a VIEEA, the host may continue to represent a particular data storage media as a single host element address, even if the data storage cartridge is moved to another physical element address.

With the advent of VIEEAs, assignment of element addresses becomes an algorithmic based function of the library firmware rather than a simple mapping of each physical location to a specific element address. When a cartridge is placed into an I/O slot, the volser of the cartridge is first checked to see if it is within a cartridge assignment policy (CAP) for a particular host. If so, the cartridge will be assigned a VIEEA corresponding only to that host and will not become visible to other hosts. If the cartridge's volser is not within any hosts' CAP, it will be assigned a common VIEEA that may be visible to multiple hosts. Volumes may also be stored in virtual storage element addresses (VSEAs), i.e., where the media resides in the library.

Some automated data storage libraries include three modes of operation including Auto, Pause, and Manual. While in manual mode, an operator may move cartridges within the library. The operator may view a manual mode panel to ascertain what actions are to be performed. These actions may include the mounting and ejecting of data storage devices.

For a manual mount operation, a drive used to access the data storage devices may include a drive operator panel which can display the volser and physical location of the cartridge. Alternatively, the operator may utilize a manual mode panel located at the library manager. This panel instructs the operator to place the new cartridge in a particular cell in the library. Demount commands are not displayed as the operator will leave demounted data storage devices in the drive unless another data storage device needs to be mounted. In this case, the demounted data storage device is placed back into the library or is held for insertion after completion of manual mode operation.

However, some automated data storage libraries are not support manual mode operation. For these types of automated data storage libraries, a manual mode must be provided by an external library manager which includes a manual mode panel displaying the volsers of volumes to be mounted.

While some automated data storage libraries are designed so that the library managers maintain both the physical and logical addresses of their data storage devices, other libraries utilize a library controller to manage the mapping of logical addresses to physical addresses. In these types of systems, a command issued by a host to a drive would only include the volser and the logical address. In manual mode, only the volser would be displayed at the drive as the logical address would be useless to an operator. Accordingly, it is desirable, in these types of automated data storage libraries, to have a method for displaying the physical location of data storage media in a manner that can be utilized by an operator.

One approach to this problem would be to utilize a library-specific command created by the library's vendor that works with a pre-defined library configuration. This vendor-specific command may be issued by a particular host configured to interface with a particular automated data storage library. The vendor-specific command may include a volser and a request to the library controller to report the corresponding physical address. A problem occurs, however, if the library configuration changes or if another configuration is desired, as the vendor-specific command will no longer function properly. Accordingly, it is desirable to have a system of issuing non-library specific commands that can be utilized by the drive to initiate a request for a physical address, wherein this non-vendor-specific command may be utilized in a multitude of varying host/library configurations.

SUMMARY OF THE INVENTION

The invention disclosed herein utilizes an drive containing a processor for implementing an algorithm that recognizes that a request has arrived from a host including a volser. In order to assist an operator with manual operations, the drive issues a request to the automated data storage library's library controller to report the physical location of the data storage medium corresponding to the volser. Once the physical address has been received by the drive, the drive displays both the volser and the physical address either together or in an alternating manner.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using an algorithm to manage the issuance of virtual import/export element addresses (VIEEAs) or virtual storage element addresses (VSEAs). The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
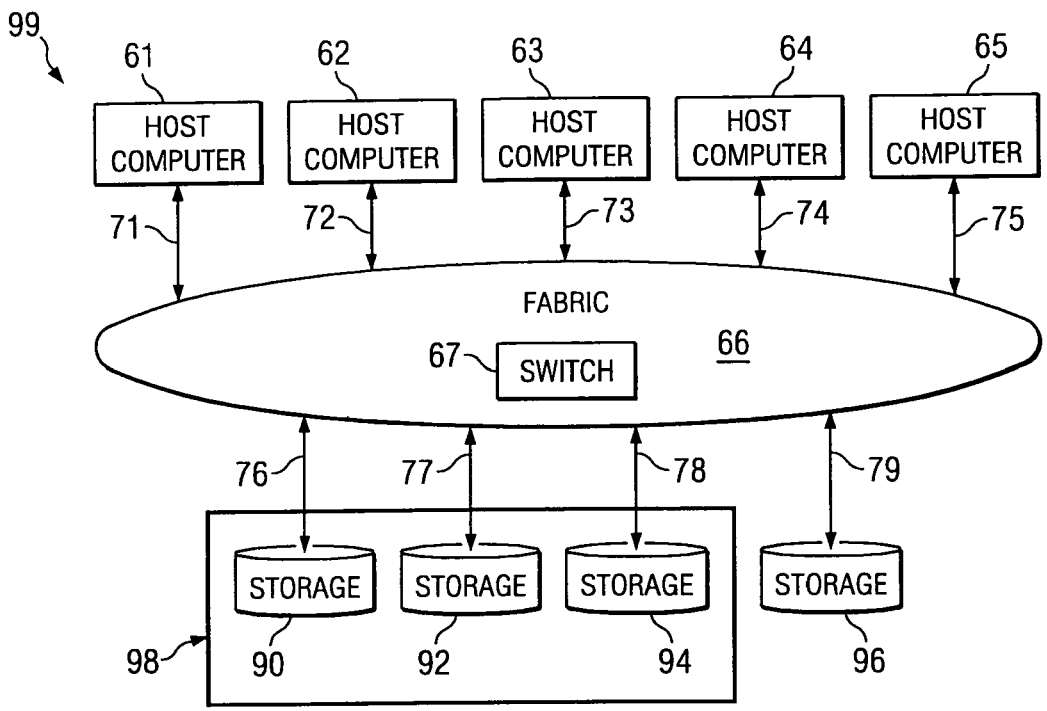
FIG. 1 is a block diagram illustrating a storage area network including a plurality of host computers, a fabric switch, a plurality of media storage devices, and a library controller.

Referring to figures, wherein like parts are designated with the same reference numerals and symbols, FIG. 1 is a block diagram that illustrates aspects of an exemplary storage area network ("SAN") 99, according to one embodiment of the present invention. The SAN 99 is designed as a switched-access-network, wherein switches 67 are used to create a switching fabric 66. In this embodiment of the invention, the SAN 99 is implemented using Small Computer Systems Interface (SCSI) protocol running over a Fibre Channel ("FC") physical layer. However, the SAN 99 could be implemented utilizing other protocols, such as Infiniband, FICON, TCP/IP, Ethernet, Gigabit Ethernet, or iSCSI. The switches 67 have the addresses of both the hosts 61, 62, 63, 64, 65 and storage units 90, 92, 94, 96.

Host computers 61, 62, 63, 64, 65 are connected to the fabric 66 utilizing I/O interfaces 71, 72, 73, 74, 75 respectively to fabric 66. I/O interfaces 71-75 may be any type of I/O interface; for example, a FC loop, a direct attachment to fabric 66 or one or more signal lines used by host computers 71-75 to transfer information respectfully to and from fabric 66. Fabric 66 includes, for example, one or more FC switches 67 used to connect two or more computer networks. In one embodiment, FC switch 67 is a conventional router switch.

Switch 67 interconnects host computers 61-65 to storage 90, 92, 94, and 96 across respective I/O interfaces 76-79. I/O interfaces 76-79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information to and from storage 90, 92, 94, and 96. In the example shown in FIG. 1, storage 90, 92, and 94 are stored within automated storage library 98, and storage 96 is network attached storage ("NAS").

Figure 2:
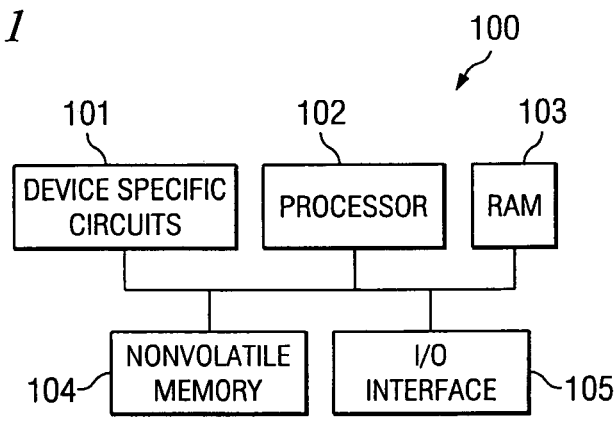
FIG. 2 is a block diagram illustrating the primary components of a library controller including a processors, non-volatile memory, and random-access memory.

An automated data storage library typically comprises one or more controllers to direct the operation of the library. The controller may take many different forms and may include an embedded system, a distributed control system, a personal computer, workstation, etc. FIG. 2 shows a typical library controller 100 with a processor 102, random access memory ("RAM") 103, nonvolatile memory 104, device specific circuits 101, and an I/O interface 105.

Alternatively, the RAM 103 and/or nonvolatile memory 104 may be contained in the processor 102 as well as the device specific circuits 101 and I/O interface 105. Processor 102 may include an off-the-shelf microprocessor, custom processor, FPGA, ASIC, or other form of discrete logic. RAM 103 is typically used to hold variable data, stack data, executable instructions, etc. The nonvolatile memory 104 may comprise any type of nonvolatile memory such as Electrically Erasable Programmable Read Only Memory ("EEPROM"), flash Programmable Read Only Memory ("PROM"), battery backup RAM, hard disk drive, or other similar device.

The nonvolatile memory 104 is typically used to hold the executable firmware and any nonvolatile data. I/O interface 105 comprises a communication interface that allows processor 102 to communicate with devices external to the controller. Examples of I/O interface 105 include serial interfaces such as RS-232 or USB (Universal Serial Bus), SCSI (Small Computer Systems Interface), Fibre Channel, etc. In addition, I/O interface 105 may comprise a wireless interface such as radio frequency ("RF") or Infrared. The device specific circuits 101 provide additional hardware to enable the controller 100 to perform unique functions such as motor control of a cartridge gripper, etc.

Device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside controller 100.

Figure 3:
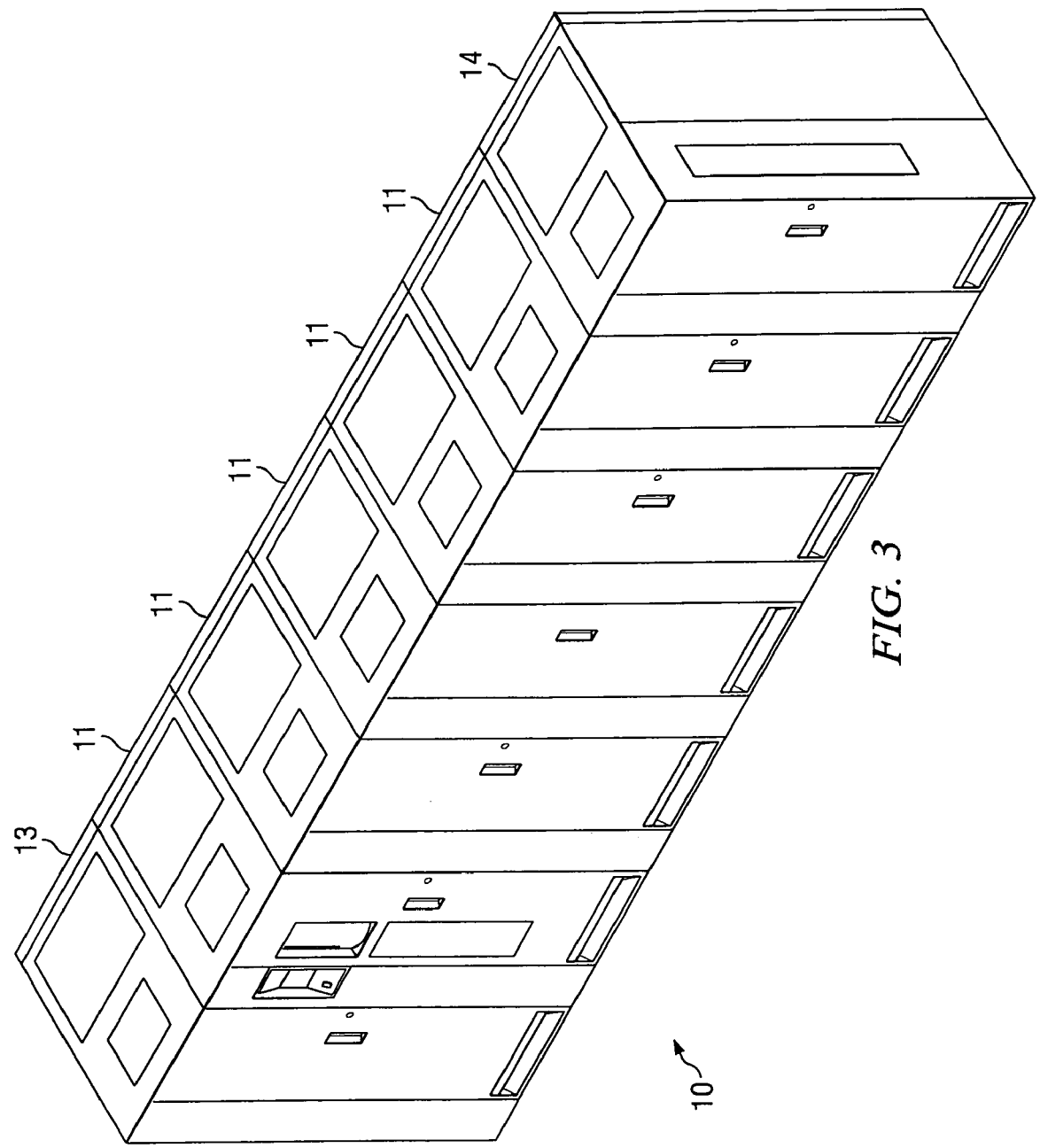
FIG. 3 illustrates an automated data storage library with a left hand service bay, one or more storage frames, and a right hand service bay.

FIG. 3 illustrates an automated data storage library 10 with left hand service bay 13, one or more storage frames 11, and right hand service bay 14. A frame may include an expansion component to the library. Frames may be added or removed to expand or reduce the size and/or functionality of the library. Frames may also include storage shelves, drives, import/export stations, accessors, operator panels, etc.

Figure 4:
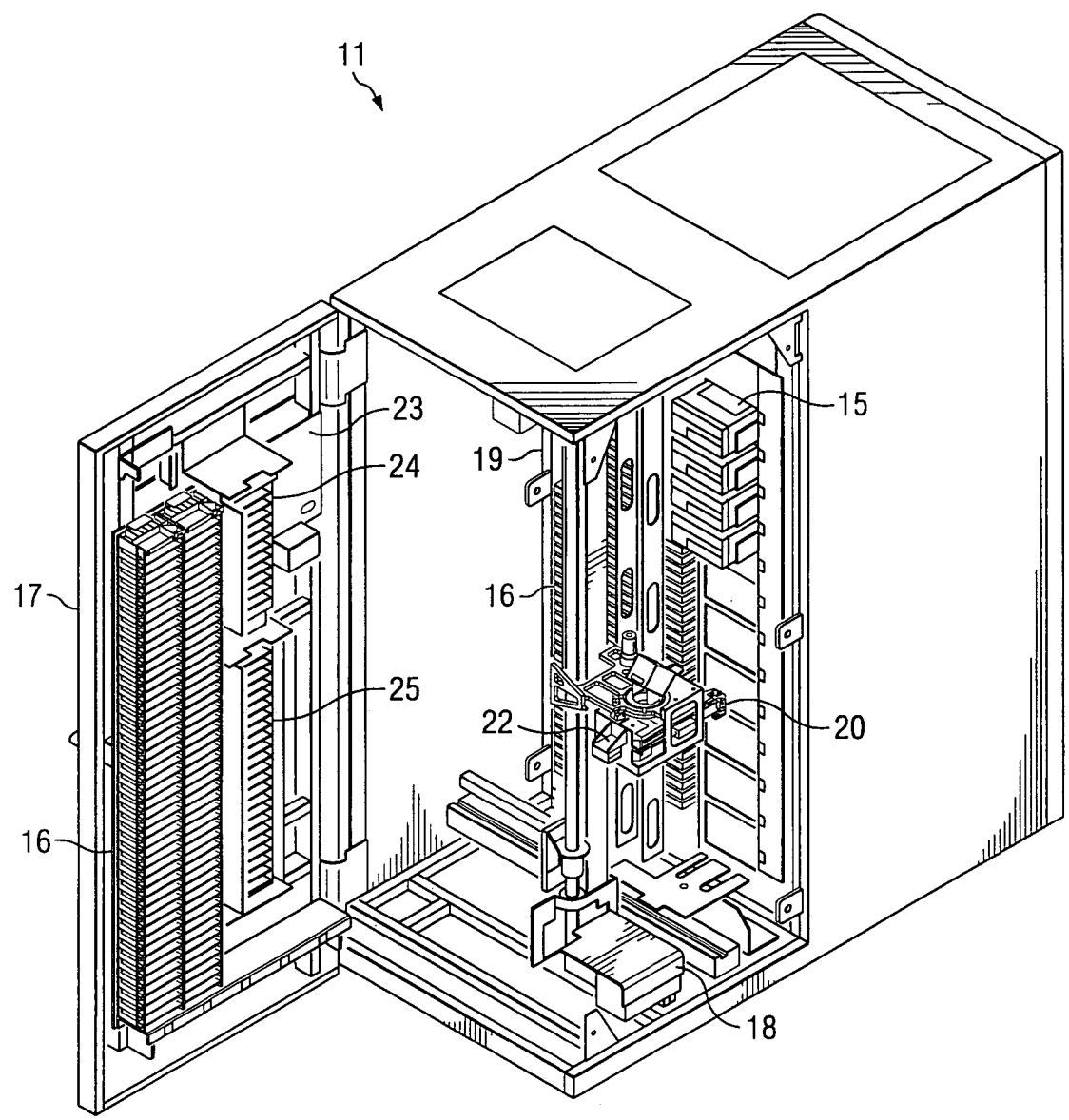
FIG. 4 shows an example of the storage frame of FIG. 3.

FIG. 4 shows an example of a storage frame 11, a configuration of the library 10 in FIG. 3. In this configuration, the library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drives 15. The storage frame 11 may optionally comprise an operator panel 23 or other user interface, such as a web-based interface, which allows a user to interact with the library.

The storage frame 11 may also include an upper I/O station 24 or a lower I/O station 25, which allows data storage media to be inserted into the library and/or removed from the library without disrupting library operation. Additionally, the library 10 may contain one or more storage frames 11, each having storage shelves 16 accessible by first accessor 18. As described above, the storage frames 11 may be configured with different components depending upon the intended function.

One configuration of storage frame 11 may comprise storage shelves 16, data storage drives 15, and other optional components to store and retrieve data from the data storage cartridges. The first accessor 18 includes a gripper assembly 20 for gripping one or more data storage media and may also include a bar code scanner 22 or reading system, such as a smart card reader or similar system, mounted on the gripper 20, to read or write identifying information about the data storage medium to a cartridge memory.

Figure 5:
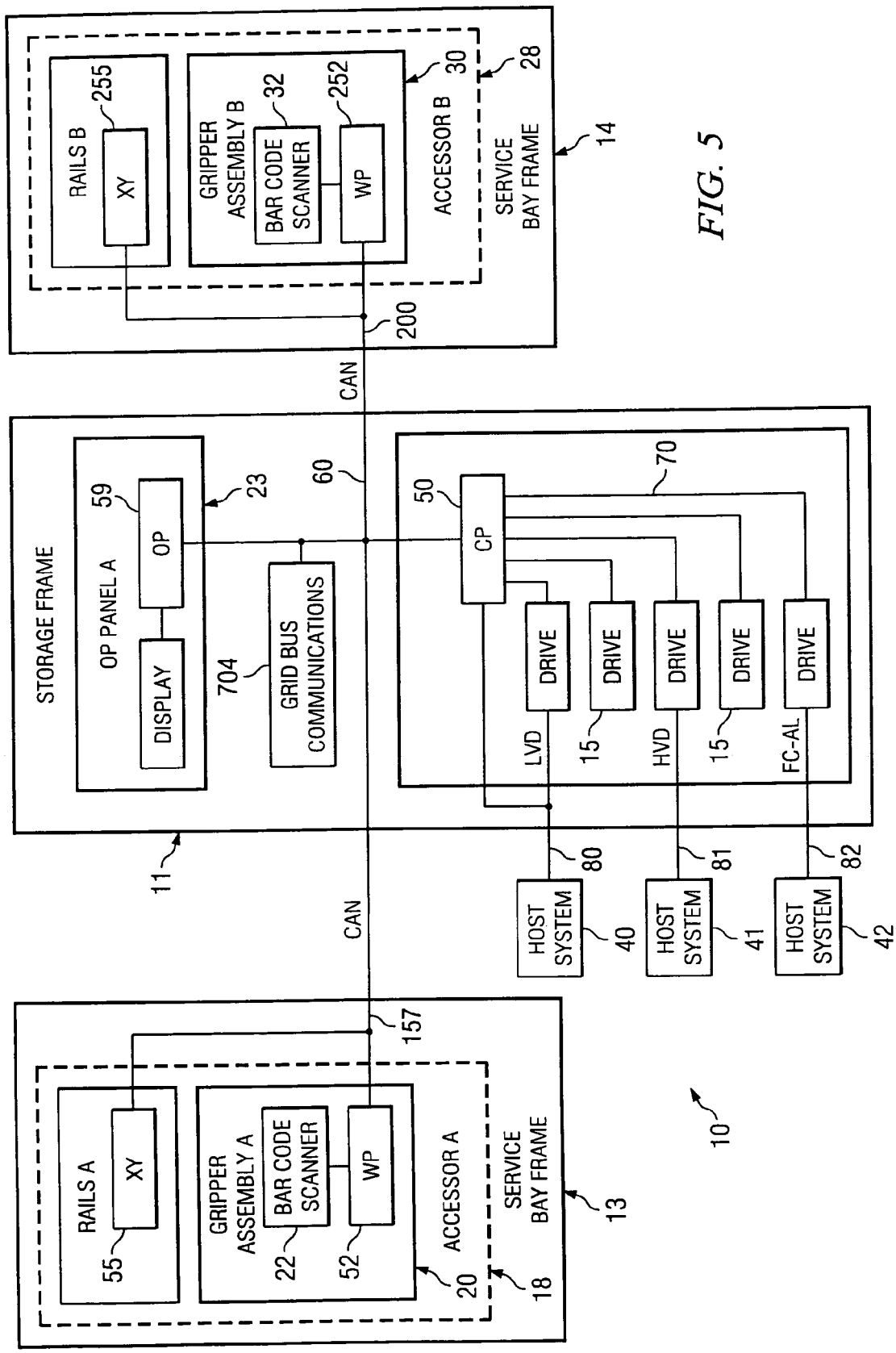
FIG. 5 illustrates internal components of the automated data storage library of FIGS. 3 and 4

FIG. 5 illustrates internal components of the automated data storage library 10 of FIGS. 3 and 4, employing a distributed system of modules with a plurality of processor nodes. An example of an automated data storage library which may implement the present invention is the IBM 3584 UltraScalable Tape Library®. While the library 10 has been described as a distributed control system, this invention applies equally to libraries that incorporate other control configurations such as one or more library controllers that are not distributed. The library of FIG. 5 includes one or more storage frames 11, a left hand service bay 13 and a right hand service bay 14.

The left hand service bay 13 is shown with a first accessor 18. As discussed above, the first accessor 18 includes a gripper assembly 20 and may include a reading system 22 to read or write identifying information about the data storage medium to a cartridge memory. The right hand service bay 14 is shown with a second accessor 28. The second accessor 28 includes a gripper assembly 30 and may include a reading system 32 to read or write identifying information about the data storage media, for example, to a cartridge memory. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. In addition, the present invention may operate with fewer or more than two accessors.

In the exemplary library, the first accessor 18 and the second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15. The exemplary library 10 receives commands from one or more host systems 40, 41, 42 or for example, hosts 61-65 shown in FIG. 1. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 (FIG. 4) and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system includes a plurality of processor nodes 50, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 1, close to the data storage drives 15. Additionally, in an example of a distributed processor system, one or more additional work processor nodes are provided, which may comprise, e.g., a work processor node 52 that may be located at first accessor 18 and that is coupled to the communication processor node 50 via a network 60, 157. A second work processor node 252 that may be located at second accessor 28 and that is coupled to the communication processor node 50 via a network 60, 200 may also be provided. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20. Similarly, an XY processor node 255 may be provided and may be located at an XY system of second accessor 28. The XY processor node 255 is coupled to the network 60.

Also, an operator panel processor node 59 may be provided at the optional operator panel 23 for providing an interface for communicating between the operator panel and the communication processor node 50, the work processor node 52, and the XY processor node 55.

A network, with a common bus 60, is provided, coupling the various processor nodes. The network may include a robust wiring network, such as the commercially available Controller Area Network ("CAN") bus system, which is a multi-drop network, having a standard access protocol and wiring standards, for example, as defined by the CAN in Automation Association ("CiA"). Other networks, such as Ethernet, or wireless network systems, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host systems with a library interface similar to the drive/library interface. As is known to those of skill in the art, various communication arrangements may be employed for communication with the hosts and with the data storage drives. In the example of FIG. 5, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as fibre channel or RS-422. The data storage drives 15 are thus individually coupled to the communication processor node 50 by means of lines 70. Alternatively, the data storage drives 15 may be coupled to the communication processor node 50 through one or more networks, such as a common bus network.

Also in FIG. 5, a grid bus communications 704 is connected to the communication processor node 50 via a network 60. Through communication processor node 50, hosts 40-42 can communicate with grid bus communications 704. Referring to both FIG. 5 and FIG. 7, hosts 40-42 and/or communication processor node 50 can wirelessly query the cartridge memory 703 of removable storage media 700 in storage slots 16. These queries may involve auditing the storage media in the storage slots, to insure that the map of the locations of the storage media in the storage slots is correct. This map of the locations of the storage media is important so that accessors 18 and 28 can go directly to the desired storage slot. This query may also include auditing the status of cleaner cartridges in storage slots 16.

Additional storage frames 11 may be provided and each is coupled to the adjacent storage frame. Any of the storage frames 11 may comprise communication processor nodes 50, storage shelves 16, data storage drives 15, and networks 60.

In FIG. 5 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 6A:
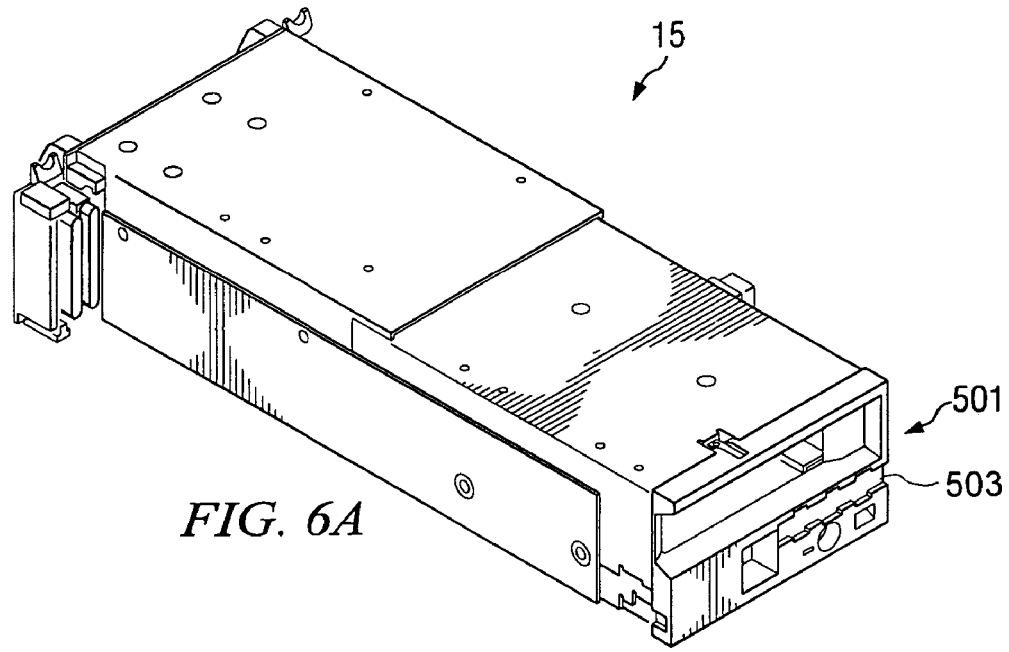
FIG. 6A shows a view of the front of the drive introduced in FIG. 5, including a drive display.
Figure 6B:
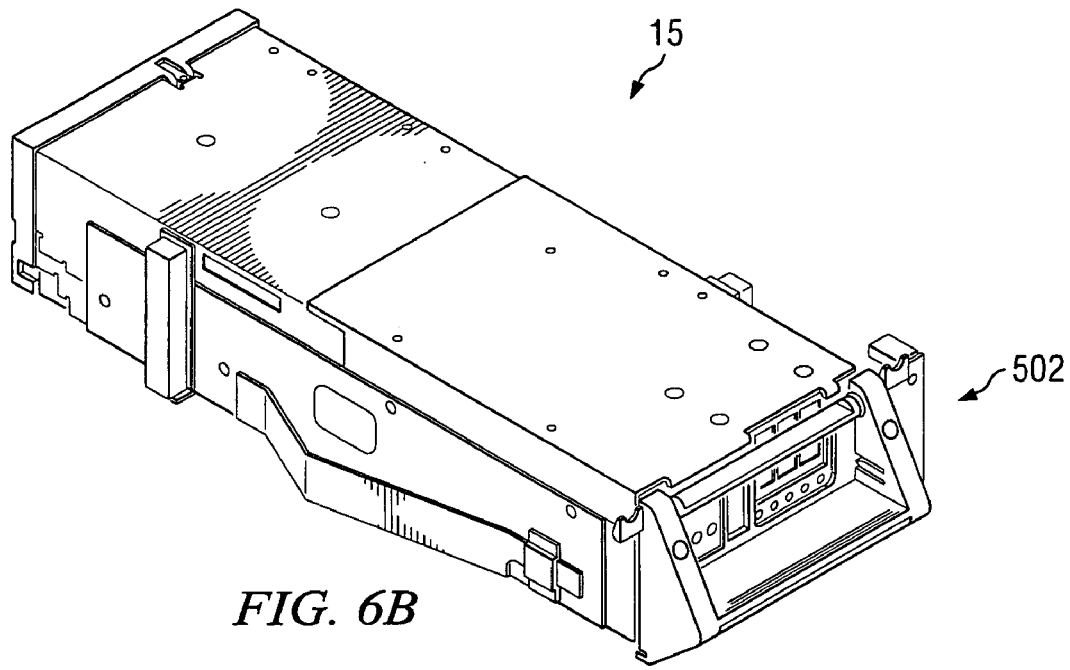
FIG. 6B shows a view of the rear of the drive of FIG. 6A.

FIG. 6A and FIG. 6B show a view of the front 501 and rear 502 of drive 15. In this example, drive 15 is a removable media LTO (Linear Tape Open) tape drive mounted in a drive canister. The front 501 of the drive 15 includes a drive display 503 for displaying alpha-numeric characters. The drive canister may comprise a housing to hold drive 15, mounting means to attach drive 15 to the drive canister, electrical components, interface cables, interface connectors, etc. The data storage drive of this invention may comprise any removable media drive such as magnetic or optical tape drives, magnetic or optical disk drives, electronic media drives, or any other removable media drive as is known in the art.

Figure 7:
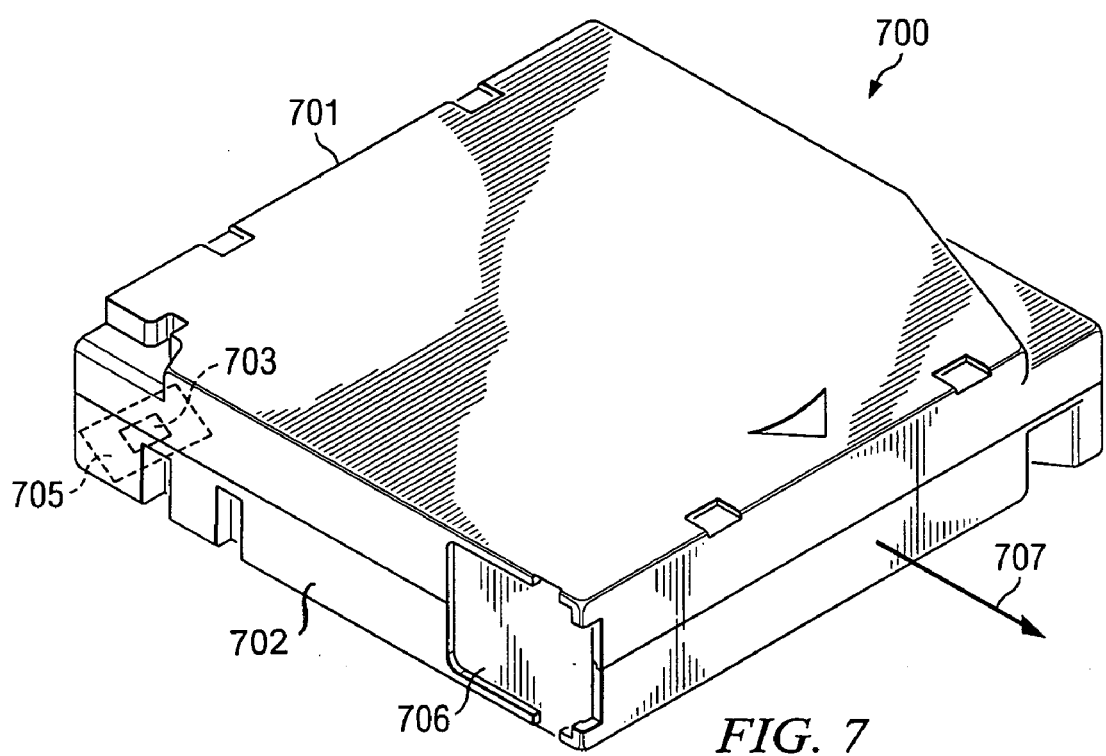
FIG. 7 shows an exemplary removable media cartridge.

FIG. 7 shows an exemplary removable media cartridge, which is tape cartridge 700. Tape cartridge 700 includes upper cartridge-shell 701, lower cartridge-shell 702, and sliding door 706. Sliding door 706 is slid open when tape cartridge 700 is inserted into drive 15. Sliding door 706 is normally closed when tape cartridge 700 is not in use, so that debris and contaminants do not freely enter tape cartridge 700 and degrade tape within the tape cartridge 700. The direction that tape cartridge 700 is slid into drive 15 is shown as direction 707. Tape cartridge 700 also contains cartridge memory 703, which is on printed circuit board 705. Cartridge memory 703 is preferably at a 45 degree angle to the side of the cartridge and the bottom of the cartridge to allow drive 15, accessors 18 and 28, and grid bus communications 704 to wirelessly access the contents of cartridge memory 703. Alternate removable media cartridges are optical disk cartridges, where the optical media may be phase change media such as DVD-RAM (Digital Versatile Disk-Random Access Memory) or DVD-RW (DVD Read-Write) or DVD-R (DVD Write-Once), magneto-optical media, stamped media such as CD-ROM (Compact Disk-Read Only Memory) or DVD-ROM. Alternate removable media cartridges contain flash memory or hard disk drives. An exemplary removable media cartridge containing a hard disk drive is U.S. Pat. No. 6,545,865, which is hereby incorporated by reference in its entirety.

Figure 8:
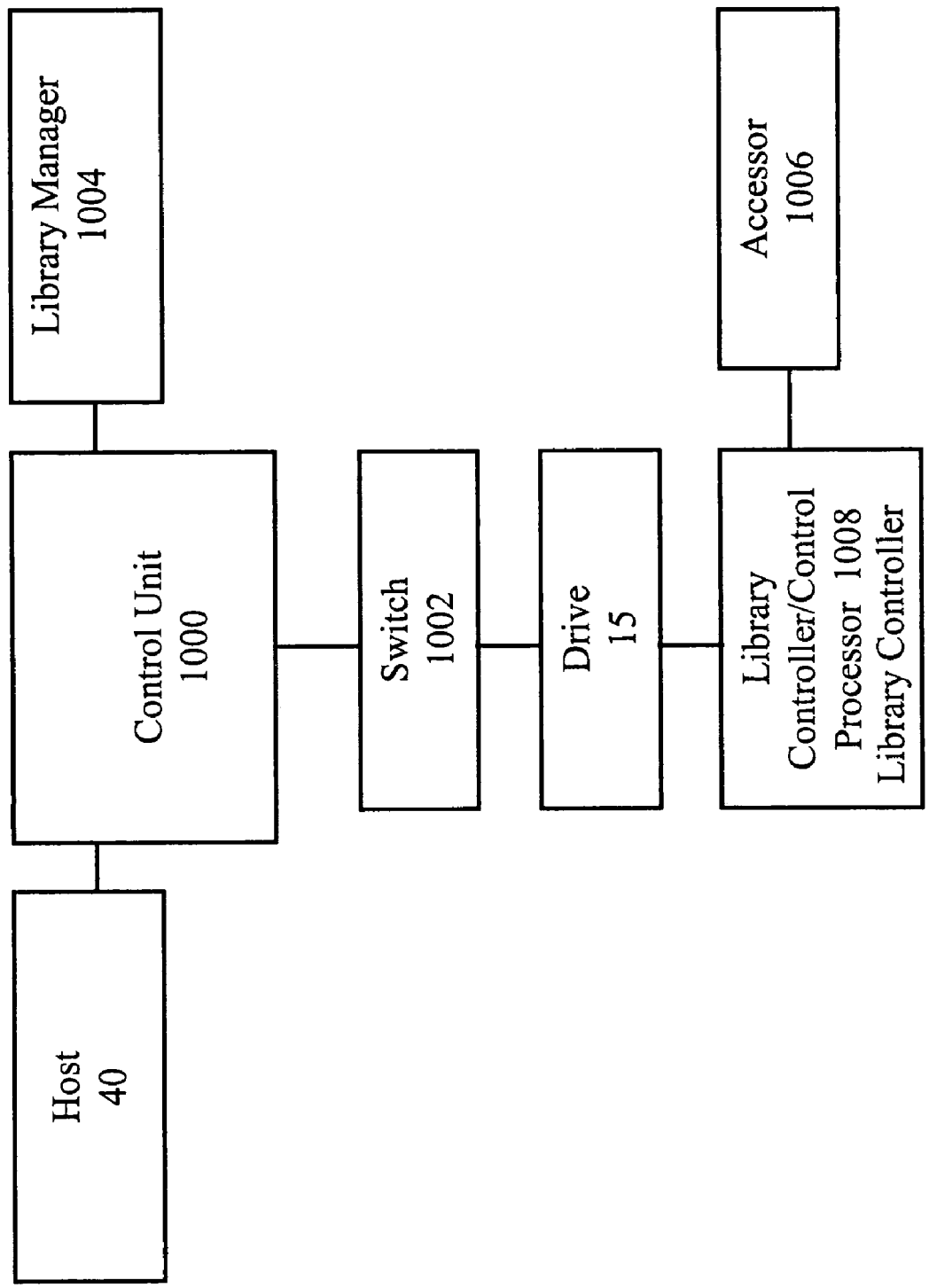
FIG. 8 illustrates an automated data storage library, according to certain aspects of the invention.

In one embodiment of the invention, as illustrated in FIG. 8, a host 40 is connected to a drive 15 via a control unit 1000 and a switch 1002 and a library manager 1004 that communicates with the drive 15 via the control unit 1000 and switch 1002. The drive 15 communicates with the library control processor 1008. The library control processor 1008 controls the accessor 1006. Here, the library control processor 1008 is responsible for mapping logical addresses received by the drive 15 to physical addresses recognized by the robotic accessor 1006. Because the library control processor 1008 maintains the tables necessary to convert the logical address to the physical address, and vice-versa, the library control processor 1008 may be queried by an operator during manual operations.

Figure 9:
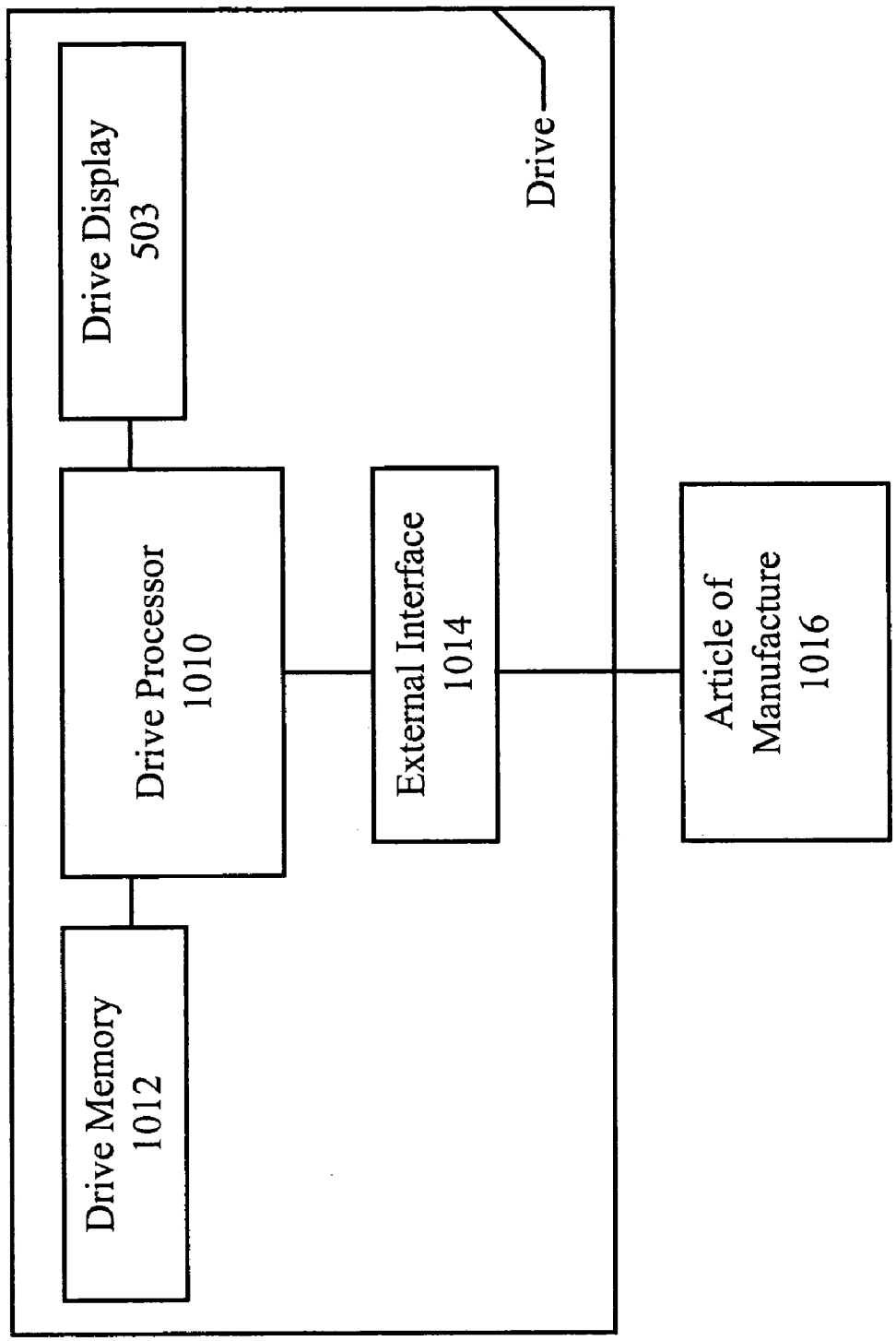
FIG. 9 illustrates, in a block diagram, the components of the drive illustrated in FIG. 6a and FIG. 6b.

FIG. 9 illustrates, in a block diagram, the drive 15 of FIG. 8 in accordance with certain implementations of the invention. Here, the drive 15 includes a drive processor 1010 and a drive memory device 1012 for holding an algorithm for use by the processor 1010. The drive processor 1010 may be a field-programmable gate array (FPGA), an application-specific integrated circuit (ASIC), a complex programmable logic device (CPLD), a general purpose processor (CPU), or any other appropriate computing device. The drive memory device 1012 may be a random access memory (RAM), a flash device, a programmable read-only memory, or other appropriate volatile or non-volatile memory. The drive 15 includes an optional external interface 1014 for accessing external devices such as an article of manufacture 1016 which may be a floppy-disk containing the algorithm to be used by the drive processor 1010.

As indicated, the library manager 1004 only knows the data storage device's virtual element address which is two level of abstraction from the physical address. However, displaying the virtual element address to an operator attempting to perform a manual operation would not provide the operator with useful information for locating the desired data storage device. Therefore, it is necessary for the drive 15 to obtain and display the physical address of the data storage device, typically in as a representation of frame number, column number, and row number.

Figure 10:
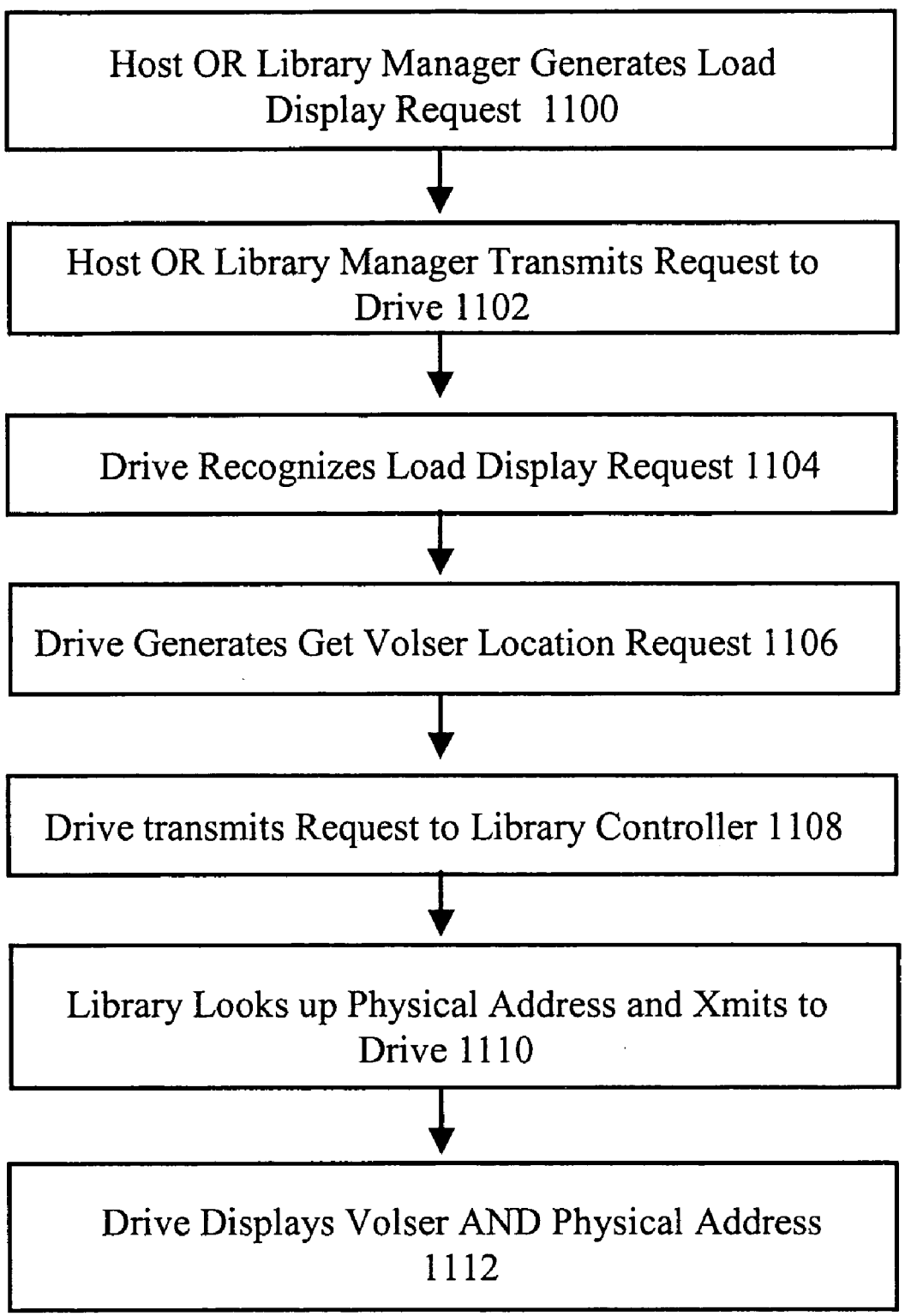
FIG. 10 is an algorithm implemented by the drive of FIG. 8 so as to display a physical location of a requested data storage device.

To solve this problem, the drive processor 1010 recognizes that a volser is currently displayed on its display panel 503 (FIG. 6a). An algorithm detailing the algorithm for displaying the physical location of the associated data storage device is illustrated in FIG. 10.

In step 1100, a host application running on a host computer 40 or an application running on the Library Manager 1004 generates a load display request with an associated volser. In step 1102, the load display request and its associated volser are transmitted through the control unit 1000 and the switch 1002 to the drive 15. The drive processor 1010 recognizes that a load display request has been received by the drive 15 in step 1104 and generates a get volser location request in step 1106. This get volser location request is transmitted to the library control processor 1008 in step 1108. In step 1110, the library control processor 1008 looks up the physical address of the data storage device corresponding to the volser and transmits the physical address back to the drive processor 1010 in step 1112. Once received by the drive 15, the physical address is displayed either with the volser on the display drive 503 or the volser and the physical address may be displayed in an alternating fashion. An example of a displayed physical location may be F1C3R4 representing the first frame 11 (FIG. 3), the third column, and the fourth row.

Those skilled in the art of data management systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A method of displaying physical addresses comprising the steps of:
   receiving a request for a data storage medium with a corresponding data storage medium identification;
   generating a request for a physical address corresponding to the data storage medium identification;
   transmitting the request to a library controller; receiving the physical address from the library controller; and
   displaying the physical address on a drive comprising a drive display, wherein the physical address is displayed on the drive display.

2. The method of claim 1, wherein the data storage medium is a tape cartridge.

3. The method of claim 1, further comprising the step of receiving algorithmic instructions from an external interface.

4. The method of claim 1, further comprising the step of displaying the data storage medium information.

5. A method of providing a service for assigning a virtual import/export element address or virtual storage element address to a data storage medium, comprising integrating computer-readable code into a computing system, wherein the computer-readable code in combination with the computing system is capable of performing the following steps:
   receiving a request for a data storage medium with a corresponding data storage medium identification;

generating a request for a physical address corresponding to the data storage device identification;
transmitting the request to a library controller;
receiving the physical address from the library controller; and
displaying the physical address on a drive comprising a drive display, wherein the physical address is displayed on the drive display.

6. The method of claim 5, wherein the data storage medium is a tape cartridge.

7. The method of claim 5, further comprising the step of receiving algorithmic instructions from an external interface.

8. The method of claim 5, further comprising the step of displaying the data storage medium information.

* * * * *